Patented May 28, 1935

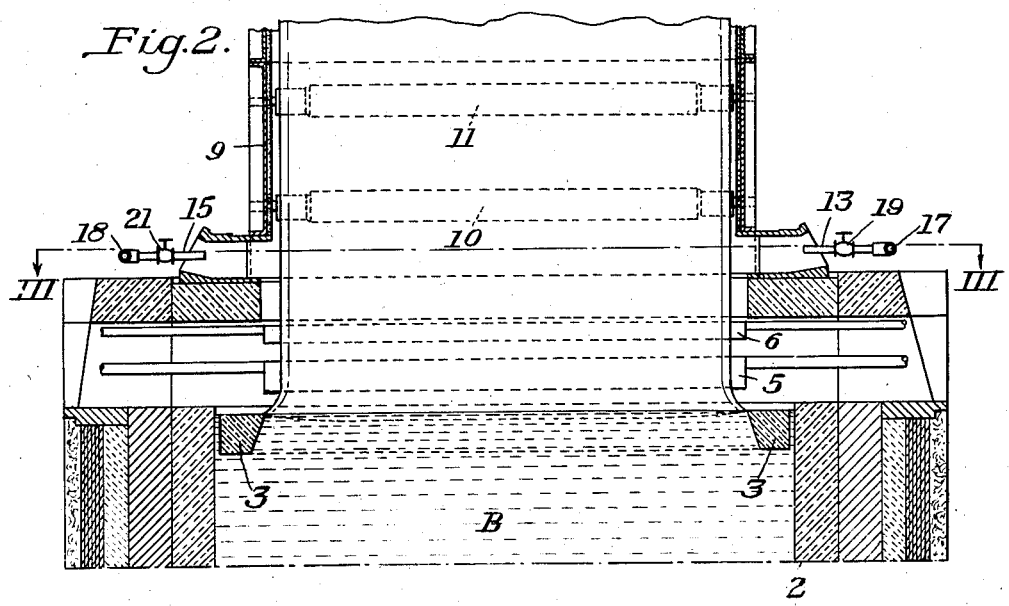

2,002,544

UNITED STATES PATENT OFFICE 2,002,544

ANNEALING SHEET GLASS

William L. Monro, Pittsburgh, Pa., assignor to American Window Glass Company, Pittsburgh, Pa., a corporation of Pennsylvania Application September 8, 1934, Serial No. 743,207

14 Claims. (Cl. 49—89)

This invention relates to the manufacture of sheet glass and particularly to the manufacture of glass in those processes wherein the same is drawn in sheet form upwardly from a bath and is carried through a vertical leer. My invention includes, among other things, certain improvements on the invention described and claimed in the co-pending application of Frederick L. Bishop, Serial No. 743,224, filed of even date herewith. My invention is herein specifically described as applied to the well known Fourcault process, but it will be understood that this is by way of example only and that the invention may likewise be used in other systems.

In the Fourcault process the glass sheet is drawn upwardly from a bath of molten glass through a slot in a debiteuse. It is passed between coolers which set the sheet and is carried upwardly from the drawing pit into and through a vertically extending leer. Adjacent the top of the leer the continuously rising glass sheet is scored and cut into desired lengths.

Heretofore it has been deemed impossible in vertical drawing-annealing systems to adequately anneal the glass. As pointed out in the Bishop application above referred to, the problem is not simply one of annealing, for in many cases it is desirable to have a certain amount of residual strain in the glass. A considerable part of the difficulty now encountered in glass drawing by vertical processes is that the strain is not uniformly distributed, in consequence of which the glass is inferior from a number of view points, among which may be mentioned that of strength, likelihood of the glass to break away from the line of the cut and irregularity on grinding and polishing.

By my invention the annealing and cooling of the glass is so controlled that the strain may be substantially or entirely eliminated, and any residual strain is so uniformly distributed as to have no detrimental effect upon the product. I accomplish these desirable ends by alterations in the time and place of annealing, and also by the circulation of a gaseous medium around the glass in certain zones. More specifically I provide for commencing the annealing while the glass is still in the drawing pit. I also complete the annealing at a lower point in the vertically extending leer and provide against any local or transversely irregular chilling of the glass in or about the annealing zone.

There are certain limitations imposed by the inherent character of the glass. The temperature of the bath must be maintained in excess of 1700° F. and preferably between 1800 and 1900° F., if early devitrification is to be avoided. This limits the amount of chilling which may be accomplished near the bath. The annealing range is from about 1100° F. down to about 850° F., and it is particularly in this range that great care must be taken in order to insure against undue or irregular strain in the glass. Preferably the precautions to be taken should extend over the range 1150° F.–850° F.

I prefer to chill the rising sheet (yet without undue chilling of the bath) so rapidly that it is well within the annealing range before it leaves the drawing pit. The walls of the drawing pit are always incandescent and the presence of the incandescent walls surrounding the glass is a great aid in the elimination of strain. Under such conditions the glass tends to relieve itself of strain by internal flow. This flow is inherently very sluggish within the annealing zone, and therefore the time of annealing is an important consideration. I have found it desirable to increase the time of annealing so that the glass is within such range for at least 20 seconds. The incandescense of the walls of the drawing pit materially aids in equalizing temperature conditions across the sheet and tends to smooth the temperature curve across the sheet and remove any irregularities therefrom.

I have found that it is desirable that there be no uncontrolled gaseous movement adjacent the rising glass sheet while the temperature thereof is within critical limits. It is therefore desirable that the pit be kept as tightly closed as practicable during operations so that air infiltration will be eliminated, and uncontrolled gaseous movement adjacent the rising sheet prevented. However, when a substantially tight pit is maintained care must be taken to otherwise provide adequate cooling of the rising sheet for if the temperature of the rising sheet is not reduced sufficiently at the meniscus the edges thereof will move toward the center of the sheet. The provision of additional cooling above that ordinarily used makes it possible to maintain a substantially tight pit. I have found that at the beginning of the draw it is desirable to permit a certain amount of air infiltration in view of the fact that the bath at this time is considerably hotter than it is during the balance of the drawing period. After the draw has been satisfactorily started, however, the pit should be maintained as tight as practicable so as to prevent uncontrolled gaseous movement.

The glass travels directly from the drawing pit into the leer, which leer is at relatively lower temperature. Here care must be taken to insure that convection currents or other causes of irregular temperature do not affect the rising glass. I prefer to reduce the temperature of the glass to below the annealing range fairly promptly after it enters the leer, and to insure against local or transversely irregular chilling. This is preferably accomplished by circulating the gaseous medium surrounding the sheet, which circulation is best accomplished by the injection of air or gas from outside the apparatus. If the air or gas which is injected is below the temperature obtaining within the apparatus at the point of injection, a certain desirable amount of additional cooling is effected.

In the accompanying drawings illustrating a present preferred embodiment of my invention—

Figure 2 is a sectional view of the lower portion of the leer and of the drawing tank taken along the line II—II of Figure 1; and Figure 3 is a horizontal sectional view taken along the line III—III of Figure 2.

Figure 1:
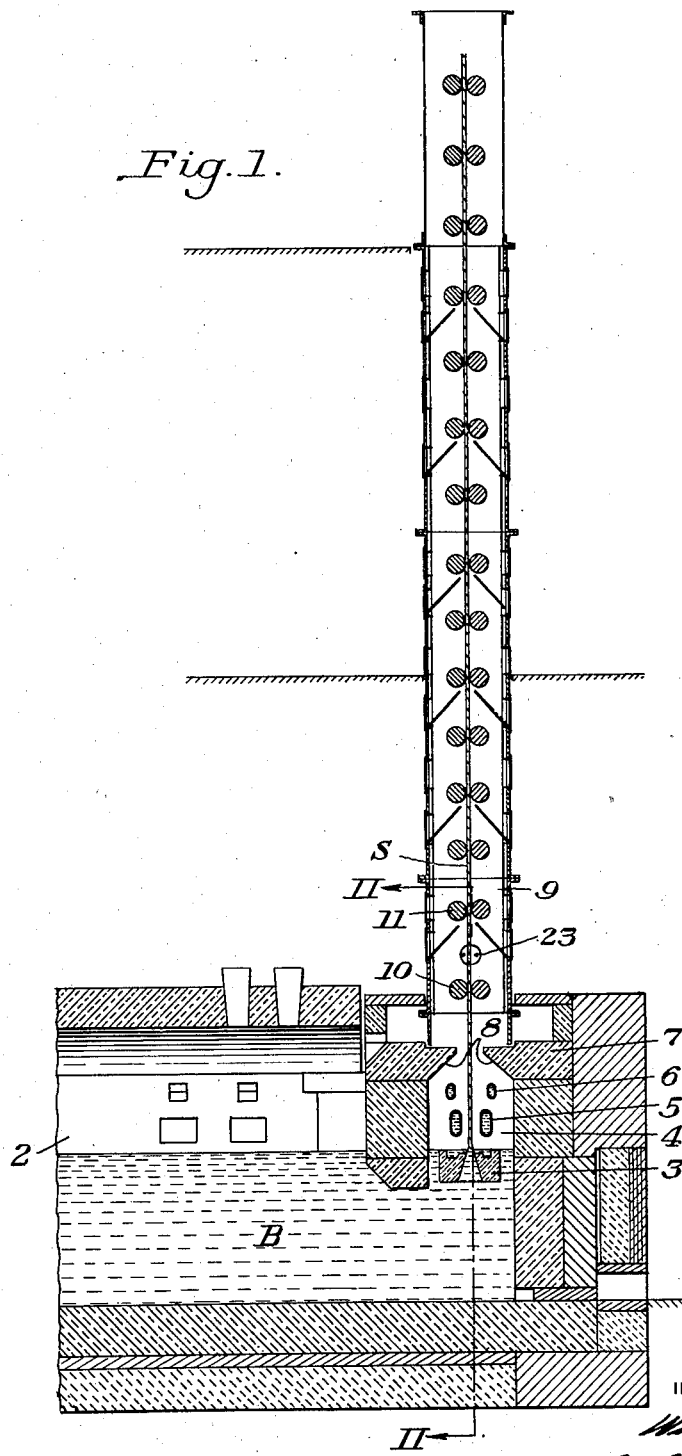
Figure 1 is a vertical sectional view through the tank and leer of glass drawing apparatus embodying my invention.

As shown in the drawings, the glass sheet S is drawn vertically from the bath B in the tank 2 through a debiteuse 3 which is located in the drawing pit 4. Coolers 5 are provided adjacent the meniscus for cooling and setting the sheet during the drawing operation. In the apparatus shown in the drawings, these coolers are 6 inches in height and are spaced apart approximately 7 inches. The coolers are the ordinary type water coolers which are well known in the art. These coolers cool the glass to a temperature approximating 1300° F., which is above the annealing range. A second set of coolers 6 is provided adjacent the sheet and above the main coolers. These auxiliary coolers in the apparatus shown in the drawings are approximately 3 inches in height and are preferably spaced apart aproximately 10 inches and are located approximately 7 inches above the main set of coolers. These coolers are utilized for the purpose of bringing the rising glass sheet down to a temperature close to or within (and preferably within) the annealing range. The sheet continues upwardly past the refractory blocks 7 which have inclined faces 8 facing the rising sheet. As the glass passes these refractory blocks 7, it is within the annealing range and the glass has an opportunity to adjust itself and reduce internal strain. The sheet then passes into the base of the leer 9 and between the first set of rolls 10 and on upwardly through the second set of rolls 11.

A blower 12 is provided for blowing air into the lower portion of the leer from each edge on opposite faces of the rising glass sheet. A single blower may be utilized for supplying air to inlet pipes 13, 14, 15 and 16 through appropriate connections 17 and 18. A valve 19 is provided in the connection leading to the inlet pipe 13 and similar valves 20, 21 and 22 are provided in the lines leading to inlet pipes 14, 15 and 16.

As the glass sheet passes through the base of the leer, air is blown therein through either one or more of the inlet pipes above described. The number of inlets to be operated at any particular time and the amount of air to be injected into the base of the leer and passed transversely of the rising glass sheet will depend upon the conditions encountered. In many instances it may be desirable at certain times to have no air whatever forced transversely of the rising sheet.

Thermocouples 23 are provided between the first and second sets of rolls to indicate the temperature of the rising glass sheet on each face thereof and adjacent each edge. The amount of air and the point at which it is passed through the base of the leer will depend upon the uniformity of cooling of the sheet as indicated by the various thermocouples. It is highly desirable to maintain uniformity of cooling, and this may be obtained by the control mechanism above described. The effect of the jets is to cause a transverse circulation of the surrounding gaseous medium around the rising glass sheet. This tends to equalize temperature conditions across the sheet and, what is probably of the greatest importance, tends to smooth the temperature curve across the sheet and remove any irregularities therefrom.

The temperature of the rising glass sheet will pass without the annealing range shortly after it emerges from the pit and passes beyond the apparatus for circulating air transversely thereacross. In the apparatus shown in the drawings, the temperature curve is extremely steep between the top of the uppermost set of coolers and the mouth of the pit, and thereafter the cooling is much more gradual and the temperature curve considerably less steep.

The glass sheet continues to pass upwardly through the annealing leer 9, and when it reaches the cut-off floor 24 it is scored and then passes on upwardly to the break-off floor where the sheet is severed along the score line.

It has been found that atmospheric air may be used for injection into the base of the leer in the manner above described. It may, however, under some conditions be desirable to use conditioned air or air which has been heated or cooled to a predetermined temperature so that the air being fed to the base of the leer will be at a constant temperature.

Excellent results have been obtained by the use of the above described apparatus and method of annealing glass sheets for all disadvantageous strain has been removed from the resulting product. It has been found that the product obtained in the practice of my process will cut readily without breakage and may be ground and polished satisfactorily. Polariscope tests show clearly that glass made in accordance with my process is satisfactorily annealed and only a slight amount of strain prevails therein. These tests show that what little strain does remain in the glass sheet is substantially uniformly distributed throughout so that no deleterious effects will be encountered by reason thereof.

If desired, air or gas may be injected into the pit so as to effect a transverse circulation therein. Regardless of whether the injection takes place in the pit or above it, there is a strong tendency to equalize the temperature conditions across the sheet and the vertical positioning of the jets will depend to some extent upon the amount of water cooling provided and the desired positioning of the annealing zone. The equalizing effect seems to be due not merely to transverse flow of the gaseous medium, but also to a reduction in the natural stack effect of vertically extending leers. The introduction of air or gas under positive pressure changes the normal stack effect and also reduces to some degree, if not entirely, the infiltration of stray currents of cold air.

The injection may be by jets or it may be by means of fans, Venturi blowers or other pressure creating devices.

While I have shown and described a preferred embodiment of my invention and the preferred method of practicing the same, it will be understood that my invention is not limited thereto, but may be otherwise embodied and practiced within the scope of the appended claims.

I claim:

1. In the method of making sheet glass, the steps consisting in continuously drawing a glass sheet from a bath of molten glass contained in a drawing pit, moving the glass continuously in a vertically extending direction until it has been annealed and cooled, and so controlling the surrounding temperature of the glass that the temperature of the glass is reduced to between substantially 1100° F. and 850° F. while inside the drawing pit.

2. In the method of making sheet glass, the steps consisting in continuously drawing a glass sheet from a bath of molten glass contained in a drawing pit, moving the glass continuously in a vertically extending direction until it has been annealed and cooled, and so controlling the surrounding temperature of the glass that the temperature of the glass is reduced to below substantially 1100° F. while inside the drawing pit and reduced to below 850° F. outside the drawing pit.

3. In the method of making sheet glass, the steps consisting in continuously drawing a glass sheet from a bath of molten glass contained in a drawing pit, moving the glass continuously in a vertically extending direction until it has been annealed and cooled, so controlling the surrounding temperature of the glass that the annealing zone lies at least partly inside the drawing pit, and maintaining incandescent surfaces adjacent the rising glass in that part of the annealing zone which lies within the drawing pit.

4. In the method of making sheet glass, the steps consisting in continuously drawing a glass sheet from a bath of molten glass contained in a drawing pit, moving the glass continuously in a vertically extending direction until it has been annealed and cooled, so controlling the surrounding temperature of the glass that the temperature of the glass sheet is reduced to within the annealing range of from 1100° F. to 850° F. while inside the drawing pit, and circulating a gaseous medium in a direction transversely of and substantially parallel to the rising glass while it is within the annealing range.

5. In the method of making sheet glass, the steps consisting in continuously drawing a glass sheet from a bath of molten glass contained in a drawing pit, moving the glass continuously in a vertically extending direction until it has been annealed and cooled, so controlling the surrounding temperature of the glass that the annealing zone of from 1100° F. to 850° F. lies at least partly inside the drawing pit, and circulating a gaseous medium in a direction transversely of and substantially parallel to the rising glass in the annealing zone and above the pit.

6. In the method of making sheet glass, the steps consisting in drawing glass in sheet form from a bath, moving it continuously in a vertically extending direction until it has been annealed and cooled and while substantially enclosed from the atmosphere, and injecting a cooling gas into the enclosure substantially at a point where the temperature of the glass is between 1100° F. and 850° F.

7. In the method of making sheet glass, the steps consisting in drawing glass in sheet form from a bath, moving it continuously in a vertically extending direction until it has been annealed and cooled and while substantially enclosed from the atmosphere, injecting a cooling gas into the enclosure substantially at a point where the temperature of the glass is between 1100° F. and 850° F. and circulating such gas in a direction transversely of and substantially parallel to the rising sheet.

8. In the method of making sheet glass, the steps consisting in drawing glass in sheet form from a bath, moving it continuously in a vertically extending direction until it has been annealed and cooled and while substantially enclosed from the atmosphere, injecting air into the enclosure substantially at a point where the temperature of the glass is between 1100° F. and 850° F., and circulating such air in a direction transversely of and substantially parallel to the rising sheet.

9. In the method of annealing a glass sheet during the continuous drawing thereof in a vertically extending direction from a bath of molten glass, the steps consisting in forming the sheet in a drawing pit containing the bath, cooling the formed sheet to between 1100° F. and 850° F. while still in the pit, maintaining it at such temperatures while passing it in a vertically extending direction, and thereafter permitting it to cool to below such temperatures.

10. In the method of annealing a glass sheet during the continuous drawing thereof in a vertically extending direction from a bath of molten glass, the steps consisting in forming the sheet in a drawing pit containing the bath, cooling the formed sheet to between 1100°F. and 850° F. while still in the pit, maintaining it at such temperatures while passing it in a vertically extending direction through the pit, and thereafter permitting it to cool to below such temperatures after passing out of said pit.

11. In the method of annealing a glass sheet during the continuous drawing thereof in a vertically extending direction, the steps consisting in cooling the formed sheet to between 1100° F. and 850° F., passing it in a vertically extending direction while maintaining it at such temperatures, and thereafter preventing localized chilling thereof by circulating a gaseous medium transversely of and parallel to the sheet while permitting it to cool to below such temperatures.

12. In the method of annealing a glass sheet during the continuous drawing thereof in a vertically extending direction from a bath of molten glass, the steps consisting in forming the sheet in a drawing pit containing the bath, cooling the formed sheet to between 1100° F. and 850° F. while still in the pit, maintaining it at such temperatures while passing it in a vertically extending direction through the pit, and thereafter preventing localized chilling thereof while permitting it to cool below such temperatures after passing out of said pit.

13. In the method of annealing a glass sheet during the continuous drawing thereof in a vertically extending direction from a bath of molten glass, the steps consisting in forming the sheet in a drawing pit containing the bath, cooling the formed sheet to annealing temperatures while still in the pit, maintaining it at annealing temperatures while passing it in a vertically extending direction through the pit, and thereafter preventing localized chilling thereof by circulating a gaseous medium transversely of the sheet while permitting it to cool to below annealing temperatures.

14. In the method of annealing a glass sheet during the continuous drawing thereof in a vertically extending direction from a bath of molten glass, the steps consisting in cooling the formed sheet to annealing temperatures of between 1100° F. and 850° F., maintaining substantially uniform temperature conditions transversely of the sheet during at least a portion of the annealing period of from 1100° F. to 850° F. while passing it in a vertically extending direction by circulating a gaseous medium in a direction transversely of and substantially parallel to the rising sheet, and thereafter permitting it to cool to below such annealing temperatures.

WILLIAM L. MONRO.